(No Model.)
C. F. PORTER.
FOOT BRAKE FOR BICYCLES.
No. 529,627. Patented Nov. 20, 1894.
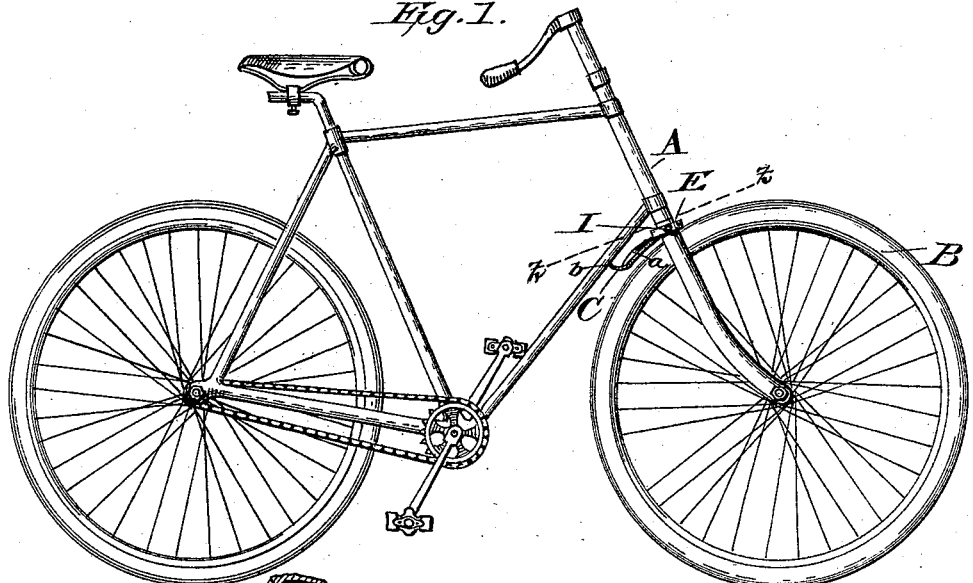
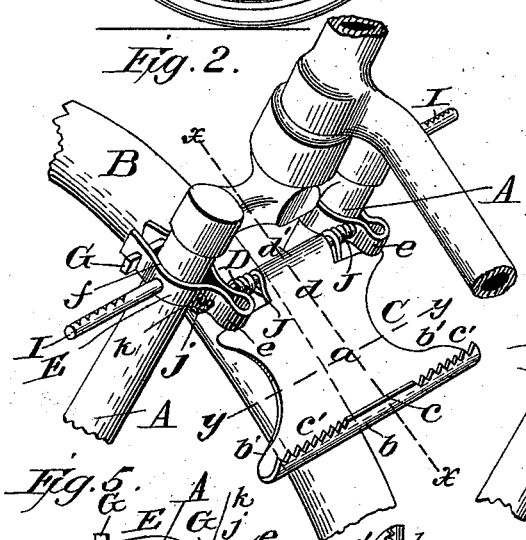
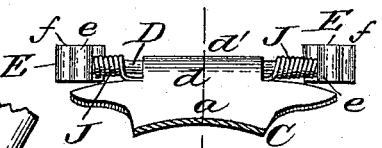
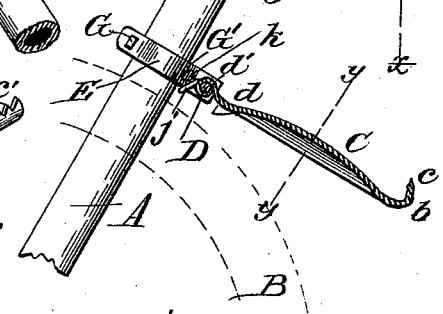
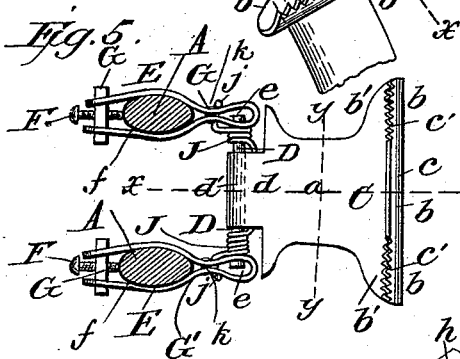
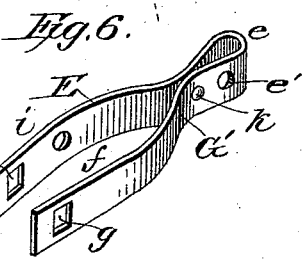
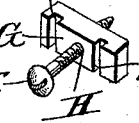
WITNESSES: F. L. Ouraud. Bennet H. Stone.
INVENTOR: Charles F. Porter.
by Louis Bagger & Co.
his Attorneys.
THE NORRIS PETERS CO., PHOTO-LITHO., WASHINGTON, D. C.

UNITED STATES PATENT OFFICE.

CHARLES F. PORTER, OF BROCKTON, MASSACHUSETTS.

FOOT-BRAKE FOR BICYCLES.

SPECIFICATION forming part of Letters Patent No. 529,627, dated November 20, 1894.

Application filed March 28, 1894. Serial No. 505,403. (No model.)

*To all whom it may concern:*

Be it known that I, CHARLES F. PORTER, a citizen of the United States, and a resident of Brockton, in the county of Plymouth and State of Massachusetts, have invented certain new and useful Improvements in Foot-Brakes for Bicycles; and I do hereby declare that the following is a full, clear, and exact description of the invention, which will enable others skilled in the art to which it appertains to make and use the same, reference being had to the accompanying drawings, which form a part of this specification; and in which—

Figure 1 is a side elevation of a bicycle or riding machine equipped with my improved direct-acting foot-brake. Fig. 2 is a perspective view, on an enlarged scale, of my improved direct-acting brake, showing the manner of attaching the same to the front-wheel fork of a bicycle. Fig. 3 is a longitudinal sectional view through the middle of the brake-plate or shoe, on line $x$—$x$ in Fig. 2. Fig. 4 is a transverse sectional view of the same on line $y$—$y$ in Fig. 3. Fig. 5 is a transverse sectional view on a plane through the fork limbs, to and between which the brake is fastened, on line $z$—$z$ in Fig. 1. Fig. 6 is a perspective detail view of one of the clips for fastening the brake to and between the limbs of the front wheel forks; and Fig. 7 is a perspective detail view of one of the dogs or devices for adjusting and fastening the brake-clips upon the front wheel fork of the machine.

Like letters of reference designate corresponding parts in all the figures.

This invention relates to brakes for bicycles and other riding machines of that type which the rider operates with the foot, or so-called "foot-brakes," in contradistinction to brakes operated by hand-power; and it consists in the improved and simplified construction and combination of parts of a direct-acting brake of that character, and the devices for fastening it to the front fork of a bicycle or tricycle frame; substantially as will be hereinafter more fully described and claimed.

In the accompanying drawings, the reference letter A denotes the front fork of a bicycle, which may be of any approved construction, and B the front wheel of the same, to which my brake, shown at C, is applied. This device consists essentially of a plate or "shoe" of steel or other suitable metal of the configuration shown on the drawings, that is to say: comprising a concavo-convex middle part $a$, a broad front part $b$, the wings $b'$ $b'$ of which extend on both sides laterally beyond the narrower middle part $a$ and the front side of which is rounded and turned up to form a straight flange $c$, both ends of which are serrated, as shown at $c'$ $c'$; and a reduced rearward extension $d$, which is bent around upon itself and formed into a sleeve $d'$, so that in conjunction with the hinge-pin or pintle D, this part will form a hinge for the brake, on which its free end or "shoe" proper can swing up or down. This brake-plate is fastened, adjustably and removably, upon and between the limbs A A of the front fork by means of side-clips E E of tempered spring-steel, each of which consists of a band of steel bent into the shape illustrated more clearly in Figs. 5 and 6, so as to form a small loop $e$, for the insertion of the ends of the hinge-pin or fulcrum-pin D, and a larger loop, $f$, for the insertion of the appropriate limb of the front fork; the smaller loop $e$ having a hole $e'$ on one side for the insertion of the adjacent end of the hinge-pin D. The free ends of the larger loop $f$ have rectangular slots in alignment with each other, as shown at $g$ $g$, for the insertion of the locking and adjusting dogs G G, one of which is shown in detail, and removed from its appropriate clip, in Fig. 7. This dog consists of a short rectangular bar of metal, provided on one side, near the ends, with two transverse parallel grooves or channels $h$ $h$, and in the middle with a screw-threaded aperture H, through which a headed and pointed screw F is inserted, adapted, when the clips are placed properly in position upon their respective fork-limbs, to be screwed up against the back part of the same, as shown in Fig. 5, and thus bind the clips G firmly upon the fork. If desired, these side-clips may be further fastened to their respective fork-limbs by means of pins I I, inserted through apertures $i$ $i$ in the sides of the clips G and into coinciding apertures drilled in the contiguous sides of the fork-limbs. These pins may be extended to form foot-rests or bearings for the feet of the rider, in proximity to the brake, as illustrated on Fig. 2.

Upon and around each projecting end of the hinge-pin D is placed a coiled spring J J, one end of each of which projects under and is soldered to the under side of the hinge-sleeve $d'$, while their other ends, $j\,j$, are bent into a hook-shape and carried around and underneath the contracted part or neck $G'$ of each clip G G, between the two loops $e$ and $f$ of the same, which are formed by the intermediate rivet $k$. This arrangement of the coiled side-springs J J causes them to operate to throw the free end of the brake-shoe, with its straight serrated flange or edge $c'\,c\,c'$, in an upward direction, clear of the wheel-tire.

From the foregoing description, taken in connection with the drawings, the manner of operating my improved direct-acting spring-actuated foot-brake will readily be understood. Normally, or when the brake is not in use, it will be kept off the wheel by the tension of the side-springs J J; but when the brake is to be applied, all that is necessary is for the rider to place either one or both of his feet upon either one (or both) of the laterally projecting serrated wings $c'\,c'$ and depress the same, thus bringing the curved and slightly concavo-convex brake-shoe $C'$ in contact with the wheel-tire, with a degree of pressure proportionate to the amount of foot-pressure brought to bear upon the brake. To release the brake, the rider simply withdraws his foot, when the side-spring will immediately lift the brake back into its neutral or inoperative position.

It will be observed that this brake is exceedingly simple in its construction and application, and can be fastened to and between the limbs of the front fork of any riding machine of any of the standard makes upon the market, without the use of extra castings or fastenings of any kind, except the clips with their dogs and adjusting-screws, which form part of my brake-device and are intended to be sold with it as part of the outfit.

Having thus described my invention, I claim and desire to secure by Letters Patent of the United States—

1. In a riding machine, the combination with the fork and the vertically adjustable clips connected therewith, of the pintle secured to said clips, the shoe or plate having a sleeve at its inner end through which said pintle passes, the coiled springs interposed between said sleeve and clips, the upwardly extending flange at the outer end of the shoe or plate and the laterally extending wings, substantially as described.

2. In a riding machine, the combination with the fork, the vertically adjustable clips having apertures therein, and the outwardly extending pins forming foot rests, passing through said apertures and engaging with corresponding apertures in the fork, of the spring actuated shoe or plate and the pintle, substantially as described.

3. The combination, in a riding-machine, with the front-fork of the machine, of the side clips E E, forming loops $e$ and $f$, and provided with the adjusting-dogs G having binding-screws F; the pintle secured to said clips, and the spring actuated shoe or plate substantially as and for the purpose shown and set forth.

In testimony that I claim the foregoing as my own I have hereunto affixed my signature in presence of two witnesses.

CHARLES F. PORTER.

Witnesses:
    DAVID H. GIBBS,
    HERBERT H. CHASE.